United States Patent
Cao (10) Patent No.: US 12,196,719 B2
(45) Date of Patent: Jan. 14, 2025

(54) SYSTEM AND METHOD FOR CHARACTERIZING A PHYSICAL PROPERTY OF A SAMPLE

(71) Applicant: THE ROYAL INSTITUTION FOR THE ADVANCEMENT OF LEARNING/MCGILL UNIVERSITY, Montréal (CA)

(72) Inventor: Changhong Cao, Montreal (CA)

(73) Assignee: THE ROYAL INSTITUTION FOR THE ADVANCEMENT OF LEARNING/MCGILL UNIVERSITY, Montreal (CA)

(*) Notice: Subject to any disclaimer, the term of this patent is extended or adjusted under 35 U.S.C. 154(b) by 430 days.

(21) Appl. No.: 17/867,743

(22) Filed: Jul. 19, 2022

(65) Prior Publication Data

US 2023/0066092 A1    Mar. 2, 2023

Related U.S. Application Data (60) Provisional application No. 63/237,706, filed on Aug. 27, 2021.

(51) Int. Cl.
  *G01N 3/08* (2006.01)
  *G01N 3/06* (2006.01)

(52) U.S. Cl.
  CPC ............ *G01N 3/08* (2013.01); *G01N 3/066* (2013.01); *G01N 2203/0019* (2013.01);
  (Continued)

(58) Field of Classification Search
  CPC .. G01N 3/08; G01N 3/066; G01N 2203/0057; G01N 2203/0019; G01N 2203/0623; G01N 2203/0286
  See application file for complete search history.

(56) References Cited

U.S. PATENT DOCUMENTS

| | | | |
|---|---|---|---|
| 6,779,410 B2* | 8/2004 | Koo | H01J 37/20 73/863 |
| 8,089,053 B1* | 1/2012 | Finch | H01J 37/20 850/52 |

(Continued)

FOREIGN PATENT DOCUMENTS

| WO | 2018/109728 A1 | 6/2018 |
|---|---|---|
| WO | 2020/084043 A1 | 10/2019 |

OTHER PUBLICATIONS

Yong Zhu, A Thermal actuator for nanosclale in situ microscopy testing : design and characterization, Institute of Physics Publishing, Journal of Micromechanics and Microengineering, Jan. 5, 2006, pp. 242-253.

(Continued)

*Primary Examiner* — Jonathan M Dunlap
(74) *Attorney, Agent, or Firm* — Reno Lessard; Norton Rose Fulbright Canada LLP (57) ABSTRACT

There is described a system for characterizing a physical property of a sample. The system generally has a microelectromechanical system (MEMS) device having a framework, a shuttle member extending along a longitudinal orientation within the framework, a shuttle actuator having obliquely extending arms extending between the framework and the shuttle member, the shuttle actuator configured for expanding the arms upon application of electricity thereacross, said expanding applying a force onto the shuttle member and moving the shuttle member at least partly in the longitudinal orientation, and a socket positioned adjacent a tip of the shuttle member; and a MEMS chip receiving the sample and being configured for insertion into the socket, whereby, when the MEMS chip is received in the socket and loaded with the sample, the force applied onto the shuttle (Continued)

member is transferred into stress internal to the MEMS chip via the tip of the shuttle member.

21 Claims, 4 Drawing Sheets

(52) U.S. Cl.
CPC ............... *G01N 2203/0057* (2013.01); *G01N 2203/0286* (2013.01); *G01N 2203/0623* (2013.01)

(56) References Cited

U.S. PATENT DOCUMENTS

| | | | |
|---|---|---|---|
| 9,404,841 B2 | 8/2016 | Oh et al. | |
| 2012/0120226 A1* | 5/2012 | de Jonge | H01J 37/20 348/80 |
| 2013/0105706 A1* | 5/2013 | Han | G01N 23/04 250/442.11 |
| 2022/0368249 A1* | 11/2022 | Moheimani | H02N 1/006 |
| 2023/0187167 A1* | 6/2023 | de Boer | B81C 1/00666 250/442.11 |

OTHER PUBLICATIONS

Bruker Nano Surfaces Division, Push-to-Pull (PTP) Device, Quantitative In-Situ Tensile with the Hysitron PI Series PicoIndenters, Pamphlet, 2017.

\* cited by examiner

SYSTEM AND METHOD FOR CHARACTERIZING A PHYSICAL PROPERTY OF A SAMPLE

FIELD

The improvements generally relate to the characterization of one or more physical properties of a sample, and more particularly relate to characterizing physical properties of thin samples such as graphene sheets.

BACKGROUND

Physical properties are properties that a sample exhibits upon the application of forces of a known amplitude, direction and/or duration and the like. Examples of physical properties can include, but are not limited to, structural properties such as the modulus of elasticity, the tensile strength, the elongation, the hardness, toughness, the fatigue limit, the topography, or other types of physical properties such as electrical properties, optical properties, electromechanical properties, thermomechanical properties, etc. When the sample to be tested is small in size, microelectromechanical system (MEMS) device can be used to perform the characterization of their physical properties. Such MEMS devices typically have a sample receiving area where the sample is deposited, and electro-mechanical components exerting forces directly or indirectly onto the sample or sample receiving area while quantifying the reaction of the sample to the exerted forces. As most existing MEMS devices used to characterize such thin samples are satisfactory to a certain degree, there always remains room for improvement, especially in reducing the risks of damaging the MEMS devices while depositing the thin samples thereon.

SUMMARY

It was found challenging to load thin samples onto the sample receiving area of the existing MEMS devices without damaging some of its electro-mechanical components. For instance, one loading technique requires to firmly press the sample onto the sample receiving area to force its adhesion thereon. Another loading technique involves the transfer of the sample onto the MEMS device via a liquid. As can be understood, both these loading techniques can significantly damage the MEMS device, and most specifically to the MEMS device's most sensitive electrical components, such as its comb-drive-based strain sensors. In an aspect, there is described a MEMS device having a socket which can receive a MEMS chip receiving the sample to be characterized. Accordingly, the MEMS can help resolve the problems associated to damaging the delicate components when loading the sample, as the loading of the sample can be performed while the MEMS chip is away from the MEMS device incorporating the sensitive elements. The MEMS chip itself can be made in a manner to exclude any sensitive element. Indeed, the sensitive elements such as the comb-drive-based strain sensor and potentially also the shuttle movement actuators can be integrated into the MEMS device which is a separate component from the sample receiving MEMS chip.

In accordance with a first aspect of the present disclosure, there is provided a system for characterizing a physical property of a sample, the system comprising: a MEMS device having a framework, a shuttle member extending along a longitudinal orientation within the framework, a shuttle actuator having obliquely extending arms extending between the framework and the shuttle member, the shuttle actuator configured for expanding the arms, said expanding applying a force onto the shuttle member and moving the shuttle member at least partly in the longitudinal orientation, at least a force sensor mounted between the shuttle member and the framework and configured to generate a signal indicative of the force applied onto the shuttle member, and a socket positioned adjacent a tip of the shuttle member; and a MEMS chip receiving the sample and being configured for insertion into the socket, whereby, when the MEMS chip is received in the socket and loaded with the sample, the force applied onto the shuttle member is transferred into stress internal to the MEMS chip via the tip of the shuttle member, the movement of the shuttle member being affected by a resistance of the sample to the transferred stress, the resistance being indicative of at least a physical property of the sample.

Further in accordance with the first aspect of the present disclosure, the MEMS chip can for example have a force receiving member and a flat sample receiving surface connected to the force receiving member where the sample is deposited, whereby a compressive force applied onto the force receiving member by the tip of the shuttle member results in longitudinal movement of the force receiving member thereby compressing the sample.

Still further in accordance with the first aspect of the present disclosure, the MEMS chip can for example have a force receiving member, at least a first transversally oriented shuttle member, at least a first force transfer arm obliquely oriented between the force receiving member and the first transversally oriented shuttle member, and a gap at a tip of the first transversally oriented shuttle member across where the sample is deposited, whereby a compressive force applied onto the MEMS chip by the tip of the shuttle member of the MEMS device results in longitudinal movement of the force receiving member which is transferred into transversal movement of the first transversally oriented shuttle member in a direction away from the gap thereby stretching the sample.

Still further in accordance with the first aspect of the present disclosure, the system can for example further comprise a second transversally oriented shuttle member, at least a second force transfer arm obliquely oriented between the force receiving member and the second transversally oriented shuttle member, the gap extending between the tip of the first transversally oriented shuttle member and a tip of the second transversally oriented shuttle member where the sample is deposited, whereby a compressive force applied onto the MEMS chip by the tip of the shuttle member of the MEMS device results in longitudinal movement of the force receiving member which is transferred into opposite transversal movement of the first and second transversally oriented shuttle members thereby stretching the sample.

Still further in accordance with the first aspect of the present disclosure, the MEMS chip can for example be removably received in the socket of the MEMS device.

Still further in accordance with the first aspect of the present disclosure, the framework of the MEMS device and the MEMS chip can for example be made of a similar material.

Still further in accordance with the first aspect of the present disclosure, the system can for example further comprise a shuttle movement sensor monitoring a movement of the shuttle member as the force is being applied onto the shuttle member.

Still further in accordance with the first aspect of the present disclosure, the shuttle movement sensor can for example be a capacitive strain sensor generating a signal varying as a function of the longitudinal movement of the shuttle member.

Still further in accordance with the first aspect of the present disclosure, the force sensor can for example be a piezoelectric force sensor.

Still further in accordance with the first aspect of the present disclosure, the system can for example further comprise a controller being communicatively coupled to the shuttle actuator, the controller having a processor and a non-transitory memory having instructions stored thereon that when executed by the processor perform the steps of: generating an actuation signal applied across the arms of the shuttle actuator thereby controlling the longitudinal movement of the shuttle member.

Still further in accordance with the first aspect of the present disclosure, said controller can for example be communicatively coupled to the at least a force sensor, the controller being configured for receiving the signal indicative of the force applied onto the shuttle member.

Still further in accordance with the first aspect of the present disclosure, said controller can for example be communicatively coupled to a shuttle movement sensor monitoring a movement of the shuttle member as the force is being applied onto the shuttle member, the controller determining the at least one physical property of the sample based on said monitored movement and on said signal received from the at least a force sensor.

Still further in accordance with the first aspect of the present disclosure, the MEMS device and the MEMS chip can for example be made from materials having similar coefficient of thermal expansion.

Still further in accordance with the first aspect of the present disclosure, the MEMS device and the MEMS chip can for example be made from similar materials.

Still further in accordance with the first aspect of the present disclosure, the shuttle actuator can for example be a thermal actuator heating the arms to cause said expanding.

In accordance with a second aspect of the present disclosure, there is provided a method of characterizing a physical property of a sample using a MEMS device having a framework, a shuttle member being longitudinally movable within the framework, and a socket positioned adjacent a tip of the shuttle member, and a separate MEMS chip, the method comprising: depositing the sample onto the MEMS chip; loading the MEMS chip into the socket of the MEMS device; while applying a longitudinal force onto the MEMS chip via the shuttle member, generating a first signal indicative of the longitudinal force exerted onto the MEMS chip and a second signal indicative of the movement of the shuttle member; and characterizing at least a physical property of the sample based on the first and second signals.

Further in accordance with the second aspect of the present disclosure, said depositing can for example include depositing the sample onto a planar substrate, and pressing the sample against the MEMS chip using the planar substrate, and freeing the planar substrate from the MEMS chip leaving the sample onto the MEMS chip.

Still further in accordance with the second aspect of the present disclosure, said depositing can for example include submerging the MEMS chip inside a solution comprising the sample, positioning the sample onto the MEMS chip, and at least one of removing the MEMS chip from the solution or drying the solution.

Still further in accordance with the second aspect of the present disclosure, the method can for example further include performing one or more transmission electron microscopy measurements on the sample while said applying.

In accordance with a third aspect of the present disclosure, there is provided a system for characterizing a physical property of a sample, the system comprising: a MEMS device having a framework, a shuttle member extending along a longitudinal orientation within the framework, obliquely extending arms extending between the framework and the shuttle member, the obliquely extending arms configured for expanding when actuated, said expanding applying a force onto the shuttle member and moving the shuttle member at least partly in the longitudinal orientation, and a socket positioned adjacent a tip of the shuttle member; and a MEMS chip receiving the sample and being configured for insertion into the socket.

Further in accordance with the third aspect of the present disclosure, the system can for example further comprise a camera imaging the sample as the force is being applied against the MEMS chip.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
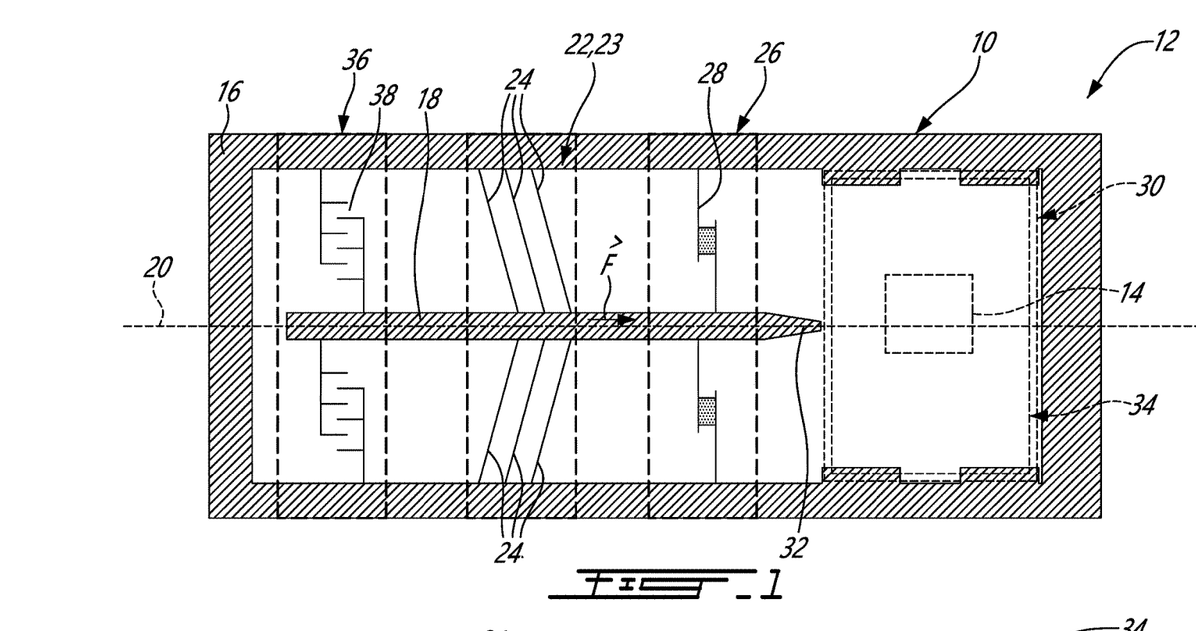
FIG. 1 is a top plan view of an example of a MEMS device having a framework, a shuttle member movably mounted to the framework, and a socket adjacent the shuttle member, in accordance with one or more embodiments.

FIG. 1 shows an example of a microelectromechanical system (MEMS) device 10 to be used in a system 12 for characterizing a physical property of a sample 14. The physical property can be a mechanical property, such as the modulus of elasticity, the tensile strength, the elongation, the hardness, toughness and/or the fatigue limit, or a topography of the sample 14, or other types of properties such as optical properties, acoustic properties, electromechanical properties and the like, depending on the embodiment. The sample 14 can be provided in the form of a thin film, a thin membrane, a nano-wire, a nanotube, and any other two-dimensional structure. For instance, the sample can have thicknesses varying from 0.1 nm to 50 μm, preferably from 0.2 nm to 1 μm, and most preferably from 0.3 nm to 100 nm. The sample can be made of a graphene layer, a graphite layer, a graphene oxide layer, a reduced graphene oxide layer, a thin transition metal dichalcogenide layer, a thin transition metal carbide layer, a thin transition metal nitride layer, a thin transition metal carbonitride layer, a polymer layer, a metal film, a ceramic film, a composite film, a biological film and the like. The sample may also be biological in nature. For instance, the system 12 described herein can be used to test cells such as endothelial cells or muscle fibers in some embodiments. As shown, the MEMS device 10 has a framework 16, a shuttle member 18 which extends along a longitudinal orientation 20 within the framework 16, and a shuttle actuator 22 having obliquely extending arms 24 extends between the framework 16 and the shuttle member 18. The shuttle actuator 22 is configured for expanding the arms 24. In this embodiment, the shuttle actuator 22 is provided in the form of a thermal actuator 23 which heats and expands the arms 24 by application of electricity across the arms 24. For instance, the thermal actuator 23 may apply or remove a current or a voltage across the arms 24 to cause the expansion or retraction of the arms 24. In some other embodiments, other types of shuttle actuators can be used including, but not limited to, piezoelectric actuators, electrostatic actuators, electrothermal actuators, electromagnetic actuators, shape memory alloy (SMA) actuators and the like. For instance, electrostatic actuator(s) to provide smaller force range but higher actuation accuracy can be used as well. In the illustrated embodiment, the arms 24 are provided in the form of V-shaped arms or chevron, however other geometries can also be envisaged in other embodiments. The expansion of the arms 24 causes a force to be applied onto the shuttle member 18 which leads the shuttle member 18 to move at least partly in the longitudinal orientation 20. The MEMS device 10 is also provided with one or more force sensors 26 mounted between the shuttle member 18 and the framework 16. Although the force sensor 26 is shown to extend transversally on each side of the shuttle member 18, the force sensor 26 can be positioned elsewhere on the MEMS device 10, as long as the force sensor 26 is mechanically connected, either directly or indirectly, to the shuttle member 18 at least during the force measurements. Each force sensor 26 is configured to generate a signal indicative of the force applied onto the shuttle member 18 by way of the expansion of the arms 24 of the shuttle actuator 22. The force sensor 26 can be provided in the form of a piezoelectric force sensor 28 in some embodiments. However, any other suitably types of force sensor can be used. Moreover, as shown, the MEMS device 10 has a socket 30 positioned adjacent a tip 32 of the shuttle member 18.

The system 12 has a MEMS chip 34 which is configured for receiving the sample 14 and configured for insertion into the socket 30 of the MEMS device 10. As such, when the MEMS chip 34 is received in the socket 30 and loaded with the sample 14, the force applied by the shuttle member 18 is transferred into stress internal to the MEMS chip 34 via the tip 32 of the shuttle member 18. Differently put, the force applied by the shuttle member 18 against the MEMS chip 14 deforms it so that the MEMS chip 14 becomes narrower thereby exerting forces onto the sample 14 deposited thereon. Accordingly, the movement of the shuttle member 18 is affected by a resistance of the sample 14 to the transferred stress and in turn the resistance is indicative of at least a physical property of the sample 14. In other words, the longitudinal movement of the shuttle member 18 against the MEMS chip, and indirectly against the sample 14, is tied to the resistance of the sample 14 and the resistance is tied to the physical property to be characterized as the shuttle member 18 will displace more or less depending on the structural properties of the sample 14.

In some embodiments, the MEMS device 10 and the MEMS chip 34 are made from materials having similar coefficient of thermal expansion to expand and contract together under similar temperature variations. More specifically, the MEMS device 10 and the MEMS chip 34 are made from similar materials. In these embodiments, the system 12 forms a monolithic block of material when the MEMS chip 34 is inserted into the socket 30 of the MEMS device 10. It was found convenient to fabricate the MEMS device 10 and the MEMS chip 34 in silicon for a number of applications. However, other materials can be envisaged in other applications.

In some embodiments, the system 12 can have a shuttle movement sensor 36 monitoring a movement of the shuttle member 18 as the force is being applied onto the shuttle member 18 by the arms 24 of the shuttle actuator 22. For instance, as depicted in this embodiment, the shuttle movement sensor 36 is provided in the form of a capacitive strain sensor 38 measuring capacitance across two conductive plates and generating a signal varying as a function of the longitudinal movement of the shuttle member 18. In these embodiments, the movement of the shuttle member 18 affects the distance between the two conductive plates and therefore modify the measured capacitance. In some other embodiments, the shuttle movement sensor 38 can be provided in the form of a camera generating images of the shuttle member 18 over time, whereby the gradual longitudinal movement of the shuttle member can be monitored from the images, e.g., using computer vision algorithms and the like.

The MEMS device 10 and the MEMS chip 34 described above can be used as follows. In a first step, the sample 14 is deposited onto the MEMS chip 34. In some embodiments, the deposition step can include a sub step of depositing the sample 14 onto a planar substrate, a sub step of pressing the sample 14 against the MEMS chip 34 using the planar substrate, and another sub step of freeing the planar substrate from the MEMS chip 34 thereby leaving the sample onto the MEMS chip 34. In some other embodiments, the deposition step can include a sub step of submerging the MEMS chip 34 inside a solution comprising the sample 14, a sub step of positioning the sample 14 onto the MEMS chip 34, and a sub step of removing the MEMS chip 34 from the solution, of drying the solution, or a combination of both. In some embodiments, the samples can also be drop-cast onto the MEMS chip in the form of a liquid bubble then dried to be adhered to the MEMS chip. Or samples can be transferred onto the MEMS chip by manipulators. Once the sample 14 has been properly deposited onto the MEMS chip 34, the MEMS chip 34 can be loaded into the socket 30 of the MEMS device 10. After, while applying a longitudinal force $\vec{F}$ onto the MEMS chip 34 via the shuttle member 18, a first signal indicative of a magnitude of the longitudinal force $\vec{F}$ exerted onto the MEMS chip 34 can be generated by the force sensor(s) 26, and a second signal indicative of the movement or displacement of the shuttle member 18 can be generated by the shuttle movement sensor 36. A subsequent step of characterizing one or more structural properties of the sample 14 based on the first and second signals can follow. In some embodiments, such as discussed below, calibration data can be used to satisfactorily quantify the physical property(ies).

In some embodiments, the system 14 is calibrated as follows. First, with the MEMS chip 34 being sample-less and inserted into the socket 30, the shuttle actuator is operated to expand the arms 24, e.g., by applying an example voltage of 1V across the arms 24, and exert a force or strain on the shuttle member 18 which then moves the shuttle member 18 longitudinally towards the MEMS chip 34. By measuring the force applied on the shuttle member 18 using the force sensor(s) 26, and by monitoring the movement of the shuttle member 18 as affected by the resistance of the sample-less MEMS chip 34, calibration data can be generated for subsequent use. After, with the sample 14 being loaded into the MEMS chip 34, and with the MEMS chip 34 being inserted into the socket 30, the shuttle actuator 22 can be operated to expand the arms 24 and exert the same force (e.g., the same example voltage of 1V across the arms 24) on the shuttle member 18 which then moves the shuttle member 18 longitudinally against the MEMS chip 34. However, as the movement of the shuttle member 18 is affected not only by the presence of the MEMS chip 34 but also by the presence of the sample 14 deposited inside the MEMS chip 34, the measured force and the monitored movement of the shuttle member 18 can be indicative, when compared to or otherwise calibrated with the calibration data, of a resistance of the sample 14 to the movement of the shuttle member 18, and in turn to the physical property to be characterized. In short, the calibration data gives an indication as to how much movement is expected to occur based on how much force was applied. It was found that as MEMS devices are small, and even if the fabrications processes are quite mature, it is difficult to imagine that satisfactory precision could be achieved without calibrating each system as a function of the potential dimensional, or other material, variations, which can occur during their manufacture.

Different types of sample characterization can be performed using different types of MEMS chips. For instance, the MEMS chip 34 can be removably received into the socket 30 of the MEMS device 12. The MEMS chip 34 can be snappingly received into the socket 30 in some embodiments. The MEMS chip 34 can be repetitively attachable to and detachable from the socket 30 of the MEMS device 10 to test a given sample many times or to test different samples sequentially. In other words, the MEMS chip 24 can be re-usable, as it can withstand the repetitive challenges associated with the deposition and removal of a significant number of different samples.

Figure 1A:
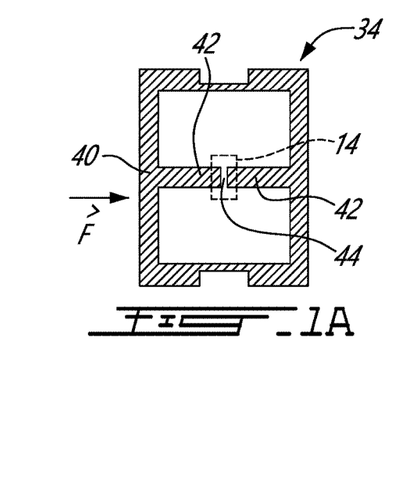
FIG. 1A is a top plan view of a first example of a MEMS chip to be inserted into the socket of FIG. 1, the MEMS chip being configured for compressive force application, in accordance with one or more embodiments.

In some embodiments, such as the one shown in FIG. 1A, the MEMS chip 34 is designed to apply compressive forces to the sample 14. In these embodiments, the MEMS chip 34 has a force receiving member 40, one or more flat sample receiving surfaces 42 connected to the force receiving member 40, and a gap 44 therebetween across where the sample 14 is deposited. Accordingly, when a longitudinal force $\vec{F}$ is applied onto the force receiving member 40 by the tip of the shuttle member, longitudinal movement of the force receiving member 40 will follow which will thereby compress the sample 14. In some other embodiments, the gap can be omitted as the sample may lie on flat sample receiving surface connected to the force receiving member. In an example situation where compression would be preferred over stretching is in the testing of lithiation evolution in lithium ion battery. In these embodiments, by compressing the MEMS chip 24, contact between an electrode and an electrolyte can be made to initiate the lithiation process. In these examples, the sample can be image to observe and monitor the lithium migration process.

Figure 1B:
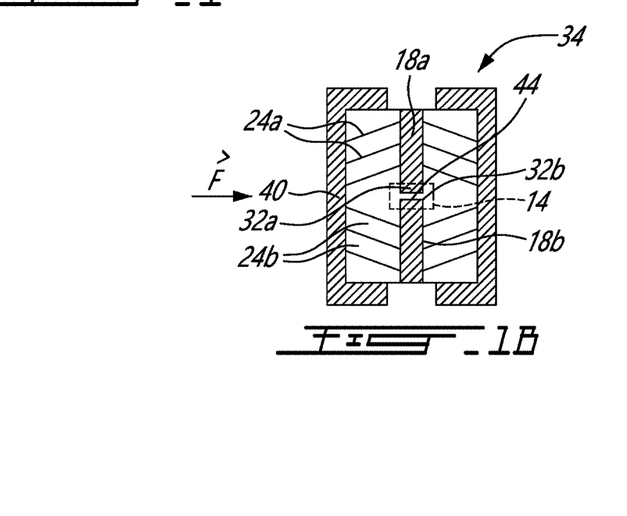
FIG. 1B is a top plan view of a first example of a MEMS chip to be inserted into the socket of FIG. 1, the MEMS chip being configured for stretching force application, in accordance with one or more embodiments.

In some other embodiments, such as the one shown in FIG. 1B, the MEMS chip 34 is designed to stretch the sample 14. In these embodiments, the MEMS chip 34 has a force receiving member 40, at least a first transversally oriented shuttle member 18a, at least a first force transfer arm 24a obliquely oriented between the force receiving member 40 and the first transversally oriented shuttle member 18a. The sample 14 is deposited at a gap 44 lying at a tip 32a of the first transversally oriented shuttle member 18a. As such, when a longitudinal force $\vec{F}$ is applied onto the MEMS chip 34 by the tip 32 of the shuttle member 18 of the MEMS device 10, longitudinal movement of the force receiving member 40 follows which then transfers into transversal movement of the first transversally oriented shuttle member 18a in a direction away from the gap 44 thereby stretching the sample 14. In some embodiments, the MEMS chip 34 can have a second transversally oriented shuttle member 18b, at least a second force transfer arm 24b obliquely oriented between the force receiving member 40 and the second transversally oriented shuttle member 18b, with the gap extending between the tip 32a of the first transversally oriented shuttle member 18a and a tip 32b of the second transversally oriented shuttle member 32b. It was found convenient to provide the first and second force transfer arms 24a and 24b in V-shaped arms. Moreover, in this embodiment, the first and second force transfer arms 24a and 24b are symmetric with respect to one another so that they apply similar force magnitude, although in opposite directions. As can be expected, when a longitudinal force $\vec{F}$ is applied onto the MEMS chip 34 by the tip 32 of the shuttle member 18 of the MEMS device 10, longitudinal movement of the force receiving member 40 follows which then transfers into opposite transversal movement of the first and second transversally oriented shuttle members 18a and 18b thereby stretching the sample 14 in opposite directions. In such an embodiment, the sample 14 opposes the first and second transversally oriented shuttle members 18a and 18b. It is thus intended that the deformation of the MEMS chip 34 occurring in response to the longitudinal force applied by the shuttle member 18 translates into tension across the gap 44 between the first and second transversally oriented shuttle members 18a and 18b of the detachable chip 34. It is noted that the first and second force transfer arms 24a and 24b are obliquely positioned within the MEMS chip 34 so that when expanded by the longitudinal force F the gap expands correspondingly. However, in some other embodiments, a MEMS chip similar to the one shown in FIG. 1B can be used, but with first and second force transfer arms obliquely positioned within the MEMS chip so that when expanded by the longitudinal force F the gaps shortens correspondingly, thereby compressing the sample instead of stretching it.

Figure 2:
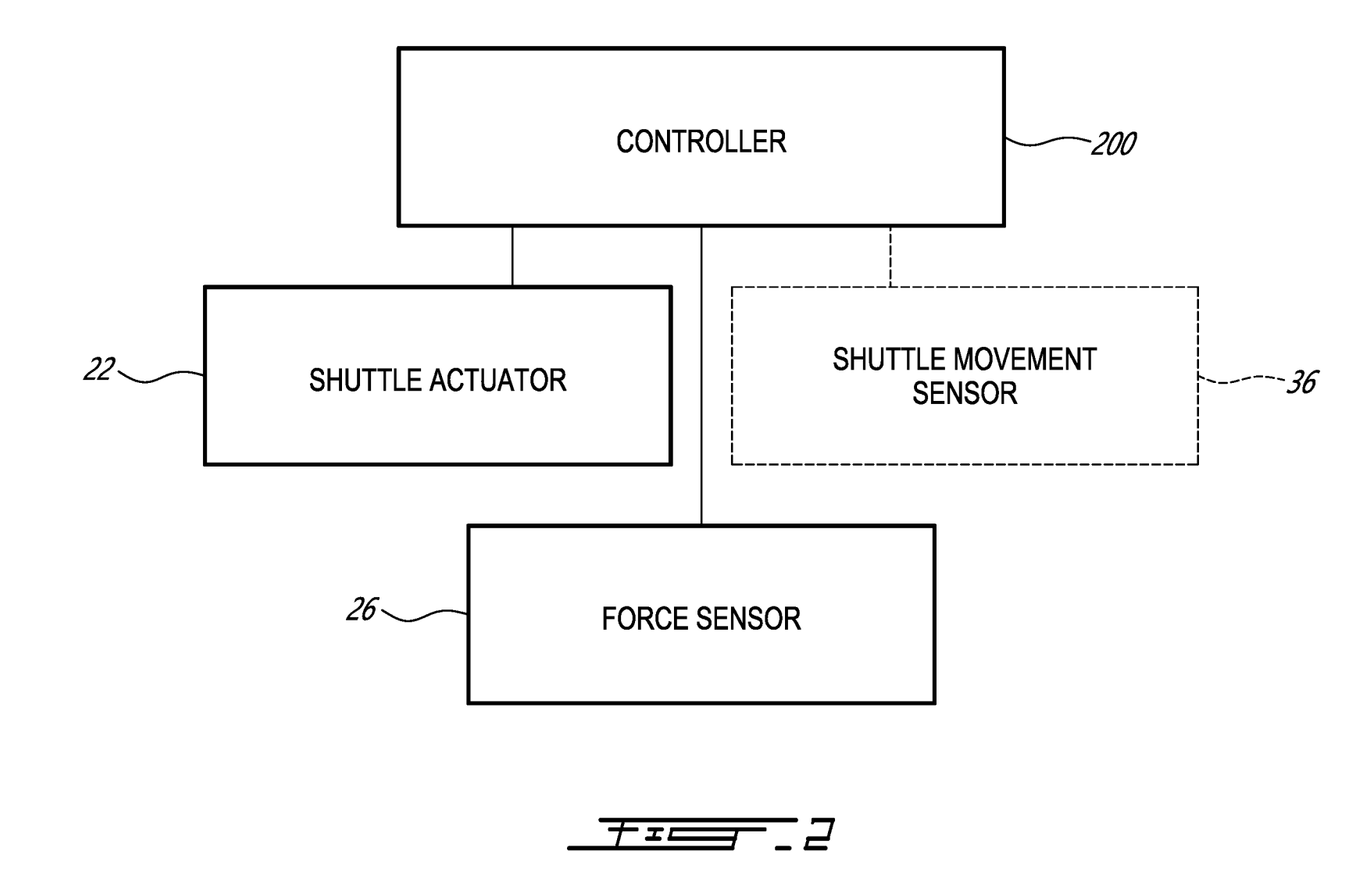
FIG. 2 is a schematic view of an example of a controller communicatively coupled to a shuttle actuator, a force sensor and a shuttle movement sensor of a MEMS system, in accordance with one or more embodiments.

The system can incorporate a controller 200 which is communicatively coupled to the shuttle actuator(s) 22, the force sensor(s) 26 and/or the shuttle movement sensor(s) 36, as shown in FIG. 2. Typically, the controller 200 has a processor and a non-transitory memory having instructions stored thereon that when executed by the processor perform steps for collectively or individually operating the shuttle actuator(s) 22, the force sensor(s) 26 and/or the shuttle movement sensor(s) 36. For instance, the controller 200 can generate an actuation signal to be applied across the arms of the shuttle actuator thereby controlling the longitudinal movement of the shuttle member. The controller 200 can also be configured to receive first signal(s) indicative of the force applied onto the shuttle member from the force sensor(s) 26 as well as second signal(s) indicative of a longitudinal movement of the shuttle movement sensor(s) 36.

Figure 3:
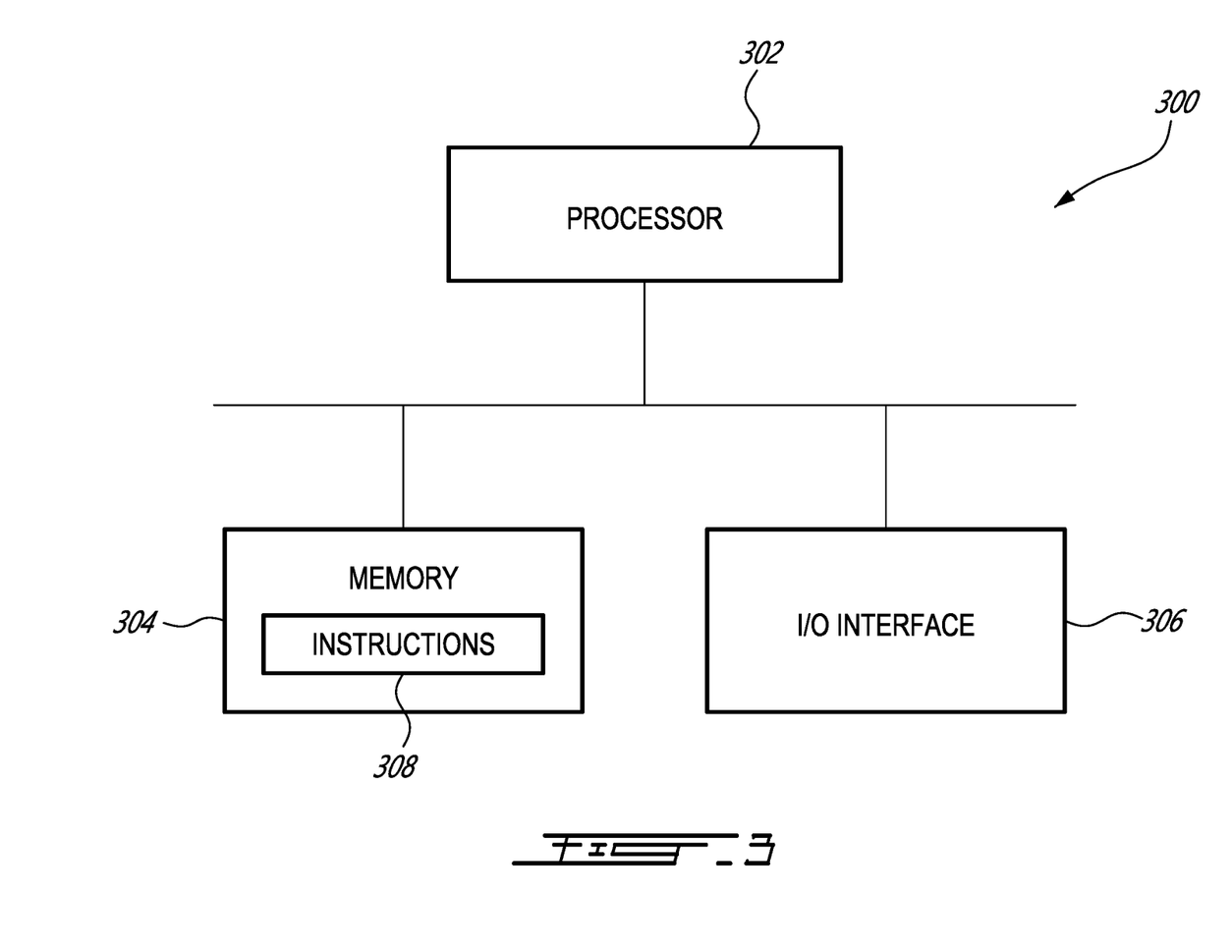
FIG. 3 is a schematic view of an example of a computing device of the controller of FIG. 2, in accordance with one or more embodiments.

The controller 200 can be provided as a combination of hardware and software components. The hardware components can be implemented in the form of a computing device 300, an example of which is described with reference to FIG. 3. Referring to FIG. 3, the computing device 300 can have a processor 302, a memory 304, and I/O interface 306. Instructions 308 for operating the MEMS device can be stored on the memory 304 and accessible by the processor 302.

The processor 302 can be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

The memory 304 can include a suitable combination of any types of computer-readable memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 306 enables the computing device 300 to interconnect with one or more input devices, such as keyboard(s) or mouse(s), or with one or more output devices such as monitors, memory systems or external networks.

Each I/O interface 306 enables the controller 200 to communicate with other components, to exchange data with other components, to access and connect to network resources, to server applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The computing device 300 described above is meant to be an example only. Other suitable embodiments of the controller 200 can also be provided, as it will be apparent to the skilled reader.

Figure 4:
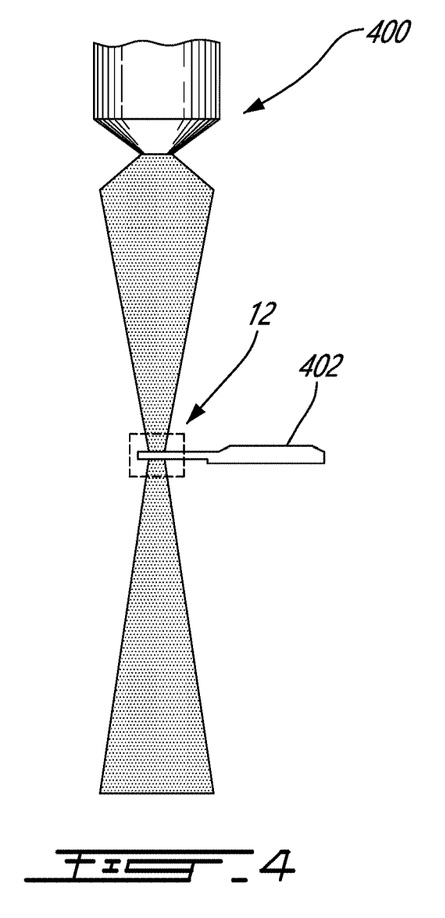
FIG. 4 is a side view of a MEMS system incorporating the MEMS device of FIG. 1 and the MEMS chip of FIG. 1B, shown during transmission electron microscopy measurements, in accordance with one or more embodiments.
Figure 4A:
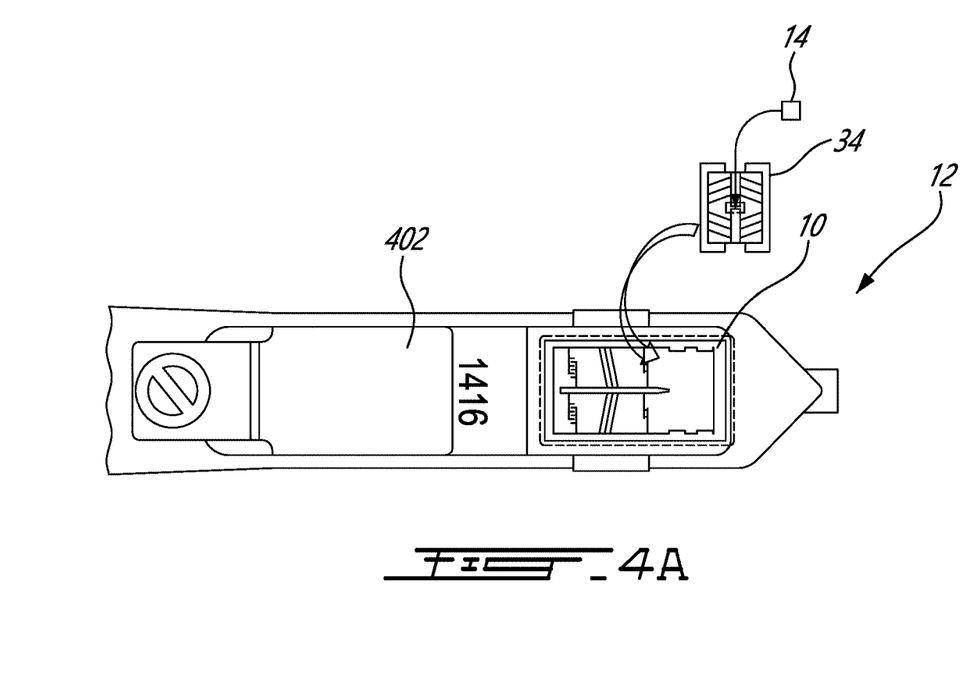
FIG. 4A is a top plan view of the MEMS system of FIG. 4, in accordance with one or more embodiments.

It is envisaged that the system, the MEMS device and the MEMS chip described herein can be used as the sample is being examined using microscopy systems. For instance, FIG. 4 shows an example of a sample 14 being examined using a transmission electron microscopy (TEM) system 400 using the system 12 described above. As shown in FIG. 4A, the system 12 can be inserted into an examination holder 402 which holds the system 12 into position, or displace the system 12, during examination. The system can be used as well under different types of examination, for instance using scanning electron microscope (SEM) and the like.

As can be understood, the examples described above and illustrated are intended to be exemplary only. For instance, although the arms of the thermal actuator 23 or of the MEMS chip can be heated by application of electricity thereacross, the heat could be otherwise applied. More specifically, in other embodiments, the arms may be heated using a laser beam or any other source of focalized electromagnetic beam radiating in a spectral range being absorbed by the material of the arms. It is understood that the design of the MEMS device and of the MEMS chip can differ depending on what material or what sample is to be tested. For instance, the shuttle actuator, the force sensor and the shuttle movement sensor are preferably tailored to the sample, or the material thereof, depending on what compression or stretching is expected to occur for each sample. In embodiments where the sample includes one or more muscle fibers, the system can be operated the other way around. For instance, an electric signal could trigger the muscle fiber(s) to move, which would result in deforming the MEMS chip and moving the shuttle member. The movement of the shuttle member can then be monitored using the force sensor(s) and used to characterize the muscle fiber(s). The geometry of the shuttle actuator, and specifically of its arms, can be designed to apply different ranges of forces to the shuttle member, depending on the sample to be characterized. It is intended that the system described herein can be preferably used in a vacuum to limit the impact or variations due to humidity and other external environmental factors. It is envisaged that the force sensor(s) can be positioned directly between the framework of the MEMS device and the shuttle member. However, the force sensor(s) can be positioned indirectly between the framework of the MEMS device and the shuttle member via the MEMS chip. For instance, the force sensor(s) may be positioned to receive a force exerted by the shuttle member through a mechanical connection via the MEMS chip. In one of such embodiments, the shuttle member lies on a given side of the MEMS chip within the framework of the MEMS device, and at least one of the force sensor(s) lies on an opposite side of the MEMS chip. In this embodiment, the force sensor can detect a force applied by the shuttle member onto the MEMS chip via a contact with the MEMS chip. The mechanical connection between the force sensor and the shuttle member is thus indirect, via the MEMS chip. In some embodiments, the physical property to be characterized is not limited to structural properties. For instance, the physical property(ies) to be characterized by the systems and methods described herein can include, but are not limited to, structural property(ies), electrical property(ies), thermal property(ies), optical property(ies), acoustic property(ies), or any combination thereof. In some embodiments, the force sensor(s) and the strain sensor(s) can be omitted. In these embodiments, the force sensor(s) and the strain sensor(s) can be sold separately or independently installed or otherwise provided. In some embodiments, only obliquely extending arms are part of the system. In these latter embodiments, the shuttle actuator mechanism can be sold separately or independently installed or otherwise provided. The scope is indicated by the appended claims.

What is claimed is:

1. A system for characterizing a physical property of a sample, the system comprising:
   a microelectromechanical system (MEMS) device having
   a framework,
   a shuttle member extending along a longitudinal orientation within the framework,
   a shuttle actuator having obliquely extending arms extending between the framework and the shuttle member, the shuttle actuator configured for expanding the arms, said expanding applying a force onto the shuttle member and moving the shuttle member at least partly in the longitudinal orientation, at least a force sensor mounted between the shuttle member and the framework and configured to generate a signal indicative of the force applied onto the shuttle member, and a socket positioned adjacent a tip of the shuttle member; and a MEMS chip receiving the sample and being configured for insertion into the socket, whereby, when the MEMS chip is received in the socket and loaded with the sample, the force applied onto the shuttle member is transferred into stress internal to the MEMS chip via the tip of the shuttle member, the movement of the shuttle member being affected by a resistance of the sample to the transferred stress, the resistance being indicative of at least a physical property of the sample.

2. The system of claim 1 wherein the MEMS chip has a force receiving member and a flat sample receiving surface connected to the force receiving member where the sample is deposited, whereby a compressive force applied onto the force receiving member by the tip of the shuttle member results in longitudinal movement of the force receiving member thereby compressing the sample.

3. The system of claim 1 wherein the MEMS chip has a force receiving member, at least a first transversally oriented shuttle member, at least a first force transfer arm obliquely oriented between the force receiving member and the first transversally oriented shuttle member, and a gap at a tip of the first transversally oriented shuttle member across where the sample is deposited, whereby a compressive force applied onto the MEMS chip by the tip of the shuttle member of the MEMS device results in longitudinal movement of the force receiving member which is transferred into transversal movement of the first transversally oriented shuttle member in a direction away from the gap thereby stretching the sample.

4. The system of claim 3 further comprising a second transversally oriented shuttle member, at least a second force transfer arm obliquely oriented between the force receiving member and the second transversally oriented shuttle member, the gap extending between the tip of the first transversally oriented shuttle member and a tip of the second transversally oriented shuttle member where the sample is deposited, whereby a compressive force applied onto the MEMS chip by the tip of the shuttle member of the MEMS device results in longitudinal movement of the force receiving member which is transferred into opposite transversal movement of the first and second transversally oriented shuttle members thereby stretching the sample.

5. The system of claim 1 wherein the MEMS chip is removably received in the socket of the MEMS device.

6. The system of claim 1 wherein the framework of the MEMS device and the MEMS chip are made of a similar material.

7. The system of claim 1 further comprising a shuttle movement sensor monitoring a movement of the shuttle member as the force is being applied onto the shuttle member.

8. The system of claim 7 wherein the shuttle movement sensor is a capacitive strain sensor generating a signal varying as a function of the longitudinal movement of the shuttle member.

9. The system of claim 1 wherein the force sensor is a piezoelectric force sensor.

10. The system of claim 1 further comprising a controller being communicatively coupled to the shuttle actuator, the controller having a processor and a non-transitory memory having instructions stored thereon that when executed by the processor perform the steps of: generating an actuation signal applied across the arms of the shuttle actuator thereby controlling the longitudinal movement of the shuttle member.

11. The system of claim 10 wherein said controller is communicatively coupled to the at least a force sensor, the controller being configured for receiving the signal indicative of the force applied onto the shuttle member.

12. The system of claim 11 wherein said controller is further communicatively coupled to a shuttle movement sensor monitoring a movement of the shuttle member as the force is being applied onto the shuttle member, the controller determining the at least one physical property of the sample based on said monitored movement and on said signal received from the at least a force sensor.

13. The system of claim 1 wherein the MEMS device and the MEMS chip are made from materials having similar coefficient of thermal expansion.

14. The system of claim 13 wherein the MEMS device and the MEMS chip are made from similar materials.

15. The system of claim 1 wherein the shuttle actuator is a thermal actuator heating the arms to cause said expanding.

16. A method of characterizing a physical property of a sample using a microelectromechanical system (MEMS) device having a framework, a shuttle member being longitudinally movable within the framework, and a socket positioned adjacent a tip of the shuttle member, and a separate MEMS chip, the method comprising:
depositing the sample onto the MEMS chip;
loading the MEMS chip into the socket of the MEMS device;
while applying a longitudinal force onto the MEMS chip via the shuttle member, generating a first signal indicative of the longitudinal force exerted onto the MEMS chip and a second signal indicative of the movement of the shuttle member; and
characterizing at least a physical property of the sample based on the first and second signals.

17. The method of claim 16 wherein said depositing includes depositing the sample onto a planar substrate, and pressing the sample against the MEMS chip using the planar substrate, and freeing the planar substrate from the MEMS chip leaving the sample onto the MEMS chip.

18. The method of claim 16 wherein said depositing includes submerging the MEMS chip inside a solution comprising the sample, positioning the sample onto the MEMS chip, and at least one of removing the MEMS chip from the solution or drying the solution.

19. The method of claim 16 further comprising performing one or more transmission electron microscopy measurements on the sample while said applying.

20. A system for characterizing a physical property of a sample, the system comprising:
a microelectromechanical system (MEMS) device having
a framework,
a shuttle member extending along a longitudinal orientation within the framework,
obliquely extending arms extending between the framework and the shuttle member, the obliquely extending arms configured for expanding when actuated, said expanding applying a force onto the shuttle member and moving the shuttle member at least partly in the longitudinal orientation, and
a socket positioned adjacent a tip of the shuttle member; and
a MEMS chip receiving the sample and being configured for insertion into the socket.

21. The system of claim 20 further comprising a camera imaging the sample as the force is being applied against the MEMS chip.

\* \* \* \* \*